United States Patent [19]

Conway, Jr.

[11] Patent Number: 5,284,310

[45] Date of Patent: Feb. 8, 1994

[54] PARACHUTE LINE SEVERING APPARATUS

[75] Inventor: Richard E. Conway, Jr., Centerville, Ohio

[73] Assignee: The United States of America as represented by the Secretary of the Air Force, Washington, D.C.

[21] Appl. No.: 38,747

[22] Filed: Mar. 22, 1993

[51] Int. Cl.$^5$ .............................................. B64D 17/30
[52] U.S. Cl. ............................. 244/151 B; 244/137.7; 244/137.4; 244/152
[58] Field of Search .............. 244/437.3, 137.4, 151 B, 244/152, 150, 149

[56] References Cited

U.S. PATENT DOCUMENTS

| | | | |
|---|---|---|---|
| 2,755,550 | 7/1956 | Benjamin | 244/151 B |
| 3,401,905 | 9/1968 | Rohrlick | 244/152 |
| 3,467,347 | 9/1969 | Cotton | 244/137.3 |
| 3,615,156 | 10/1971 | Blain et al. | 244/150 |
| 3,840,988 | 10/1974 | Hoffman | 244/151 B |
| 4,779,824 | 10/1988 | Leger | 244/137.3 |

*Primary Examiner*—Michael S. Huppert
*Assistant Examiner*—Virna Lissi Ansley
*Attorney, Agent, or Firm*—Edward W. Nypaver; Thomas L. Kundert

[57] ABSTRACT

A parachute extraction line severing apparatus comprising an extensible cutting head depending by means of a power cord from a power cord take-up assembly The cutting head includes a housing having one or more cutting devices and a viper line extending about a parachute extraction line and normally disposed in an out-of-the-way position along the interior walls of a cargo compartment. The opposite ends of the viper line are connected to and adapted to be wound about adjacent spools of a take-up reel mounted in said housing. In the event of a cargo airdrop malfunction, rotation of the spools is effective to gather the viper line into embracing relation with the extraction line to generate a reactive force drawing the cutting head and blades into engagement with the extraction line to sever the same. Once the extraction line is severed releasing the reaction force, a spring loaded spindle in the take-up assembly retracts the power cord carrying the cutting head therewith into its normal inoperative position.

8 Claims, 4 Drawing Sheets

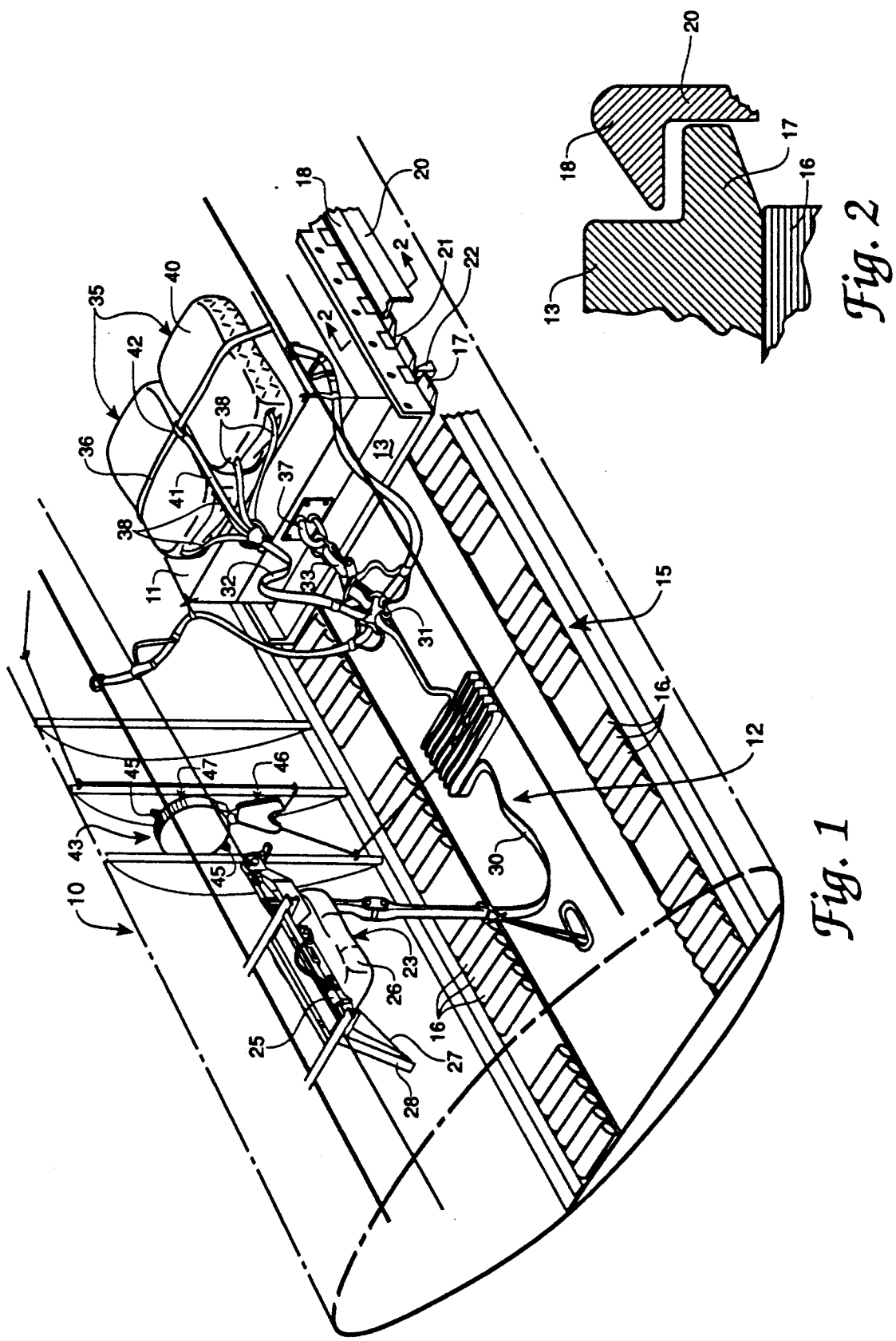

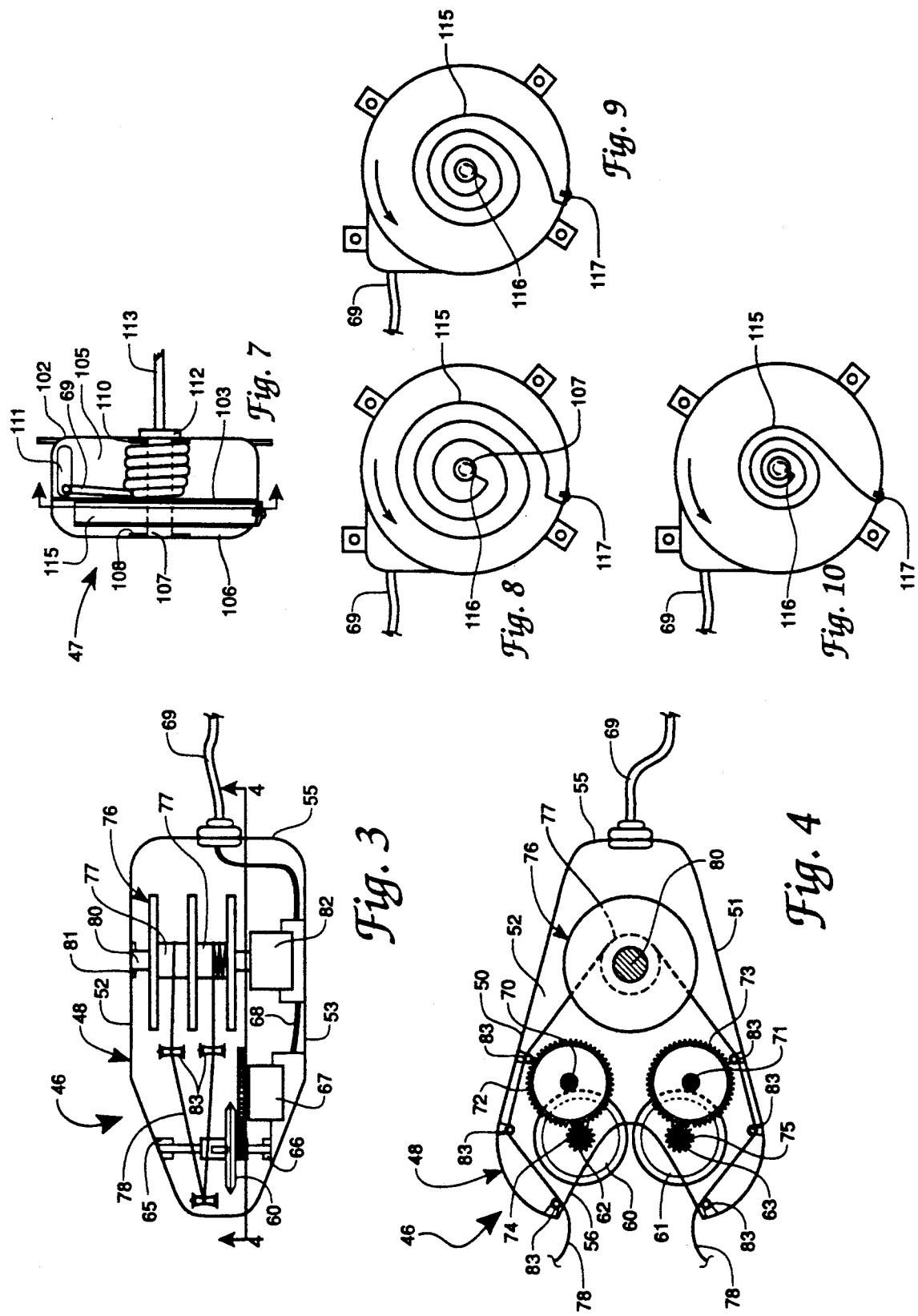

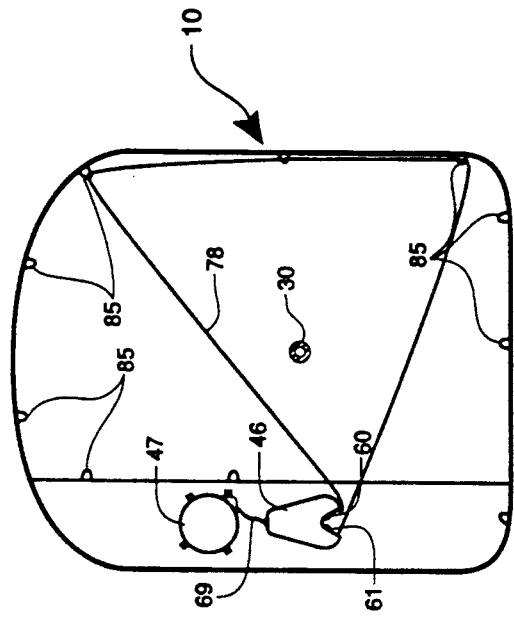
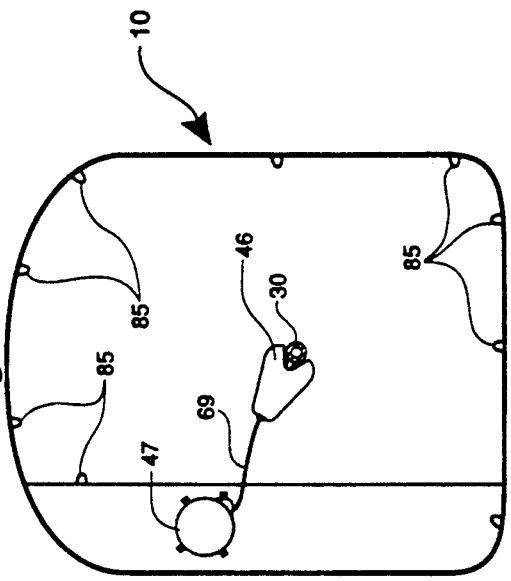
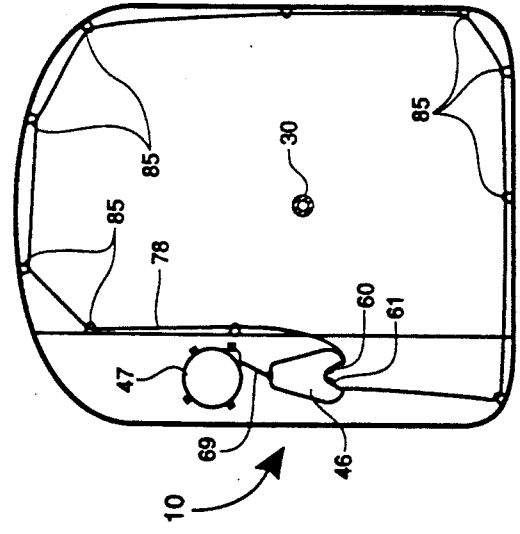
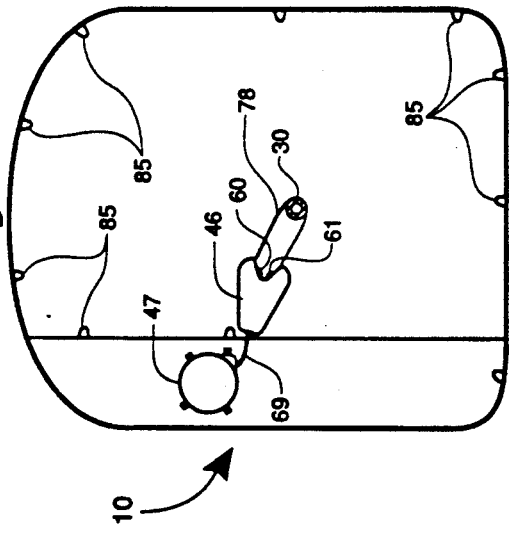
Fig. 11b
Fig. 11d
Fig. 11a
Fig. 11c

PARACHUTE LINE SEVERING APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to a parachute extraction system for airdropping heavy equipment or cargo from an aircraft and, more particularly, to an apparatus and method for severing the parachute extraction line in the event of an airdrop malfunction.

Under normal airdrop conditions, the drag force created by the inflation of an extraction parachute deployed behind the aircraft is utilized to extract cargo therefrom and deploy a recovery parachute from which the extracted load is suspended and lowered to the earth's surface. Alternately, the extraction parachute alone can be utilized to both extract the load from the aircraft as well as lower the load to the earth's surface.

The cargo to be extracted from a cargo aircraft is fixedly secured to a pallet or platform adapted to be moved longitudinally on a roller conveyor mounted along the floor of a cargo compartment. Generally, cargo aircraft employ two separate and distinct, laterally spaced releasable locking mechanisms for restraining the pallet and its associated load in the aircraft. The locking mechanism (left-hand locks) located on the left side of the cargo compartment are called the logistics locks and are engaged or disengaged by the loadmaster. These locks are disengaged prior to reaching the airdrop point. The right-hand locks, also called the Air Drop System (ADS) locks, are operative in the same manner as the left-hand locks. However, the right-hand locks can be set to release or disengage automatically upon the application of a predetermined force, such as that generated by a fully inflated extraction parachute. This prevents the extraction of the load if the extraction parachute does not deploy properly or does not fully inflate.

In operation, the left-hand locks are released a few minutes prior to the time of the airdrop. The loadmaster visually confirms that the left-hand locks are disengaged. The rear door of the aircraft is then opened and, at the proper time, the extraction parachute is discharged through the aircraft's aft open end for deployment. When the extraction parachute is fully inflated, the drag force supplied by the extraction parachute to the load overcomes the release force set in the right-hand locks. The locks are thus disengaged and the extraction parachute becomes effective to withdraw, via the extraction line, the cargo-laden pallet as well as the recovery parachute from the aircraft. As the pallet leaves the aircraft, a force transfer coupling transfers the extraction force from the cargo-laden pallet to the bags holding the recovery parachutes. The bags and recovery parachutes are pulled away from the now free falling cargo-laden pallet until the suspension slings attaching the recovery parachutes to the cargo-laden pallet are fully extended. At this point, the extraction parachute pulls the bag from the recovery parachutes, the recovery parachutes inflate, and the cargo-laden pallet is slowly lowered to the ground.

A serious problem with the above procedure resides in a cargo airdrop malfunction wherein the load is not extracted even though the extraction parachute has deployed properly but for some reason the load fails to exit the aircraft, or because the extraction parachute does not properly deploy or inflate. In either case, the loadmaster must first try to re-engage the left-hand locks. However, once the left-hand locks have been released and an extraction force has been applied, it is often impossible to re-engage the locks. Failing to re-engage the left-hand locks, the loadmaster must chain the pallet to the floor to make it safe to move aft of the load to manually cut the extraction line with a knife. Should the load free itself with the malfunctioning locks released, the load could then be extracted from the aircraft, taking the loadmaster with it. An even worse condition occurs when the drag force of the extraction parachute exceeds the thrust capabilities of the aircraft's engines. In this event, should the load fail to exit the aircraft due to any number of reasons, the extraction line must be cut quickly or the aircraft will lose airspeed and possibly crash.

SUMMARY OF THE INVENTION

Accordingly, it is a primary object of the present invention to avoid the above noted disadvantages by providing a new and improved apparatus for safely severing a parachute extraction line to disengage the extraction parachute from the load in the event of an airdrop malfunction.

It is another object of this invention to provide the foregoing severing apparatus with an extensible cutting head adapted to be extended into cutting relation with the parachute extraction line for severing the same.

It is a further object of the present invention to provide the foregoing cutting head with a line circumscribing the parachute extraction line and when drawn into contact therewith adapted to generate a force extending the cutting head into engagement with the parachute extraction line.

The foregoing and other objects, advantages, and characterizing features of this invention will become clearly apparent from the ensuing detailed description thereof considered in conjunction with the accompanying drawings wherein like reference numerals denote like parts throughout the various views.

In accordance with the present invention, an apparatus is provided for severing a parachute extraction line in the event of an airdrop malfunction. The apparatus includes an extensible cutting head having one or more cutting blades or devices and which is suspended from a spring loaded take-up reel or spindle by means of a power cord wound about the take-up reel. The cutting head also includes a viper line wrapped about a rotatable spool and normally extending in a closed loop about the extraction line and along the inner wall of the cargo compartment by releasable clips between the extraction parachute and the load/recovery parachute. In the event of an airdrop malfunction wherein the extraction parachute has exited the aft end of the aircraft but the cargo load fails to be extracted out of the aircraft the loadmaster activates the viper line system. The rotatable spool is activated to gather the line which is readily released from the clips and pulled radially inwardly into engagement with the parachute extraction line. With continued rotation of the spool, a reaction force is generated by the viper line bearing against the parachute extraction line to draw the cutting head along with the power cord toward such extraction line, until the cutting blade engages and severs the extraction line. In the absence of the reaction force upon severing the extraction line, the spring loaded take-up reel begins to wind the power cord thereby retracting the cutting head to its inoperative position adjacent the take-up reel.

BRIEF DESCRIPTION OF THE DRAWING FIGURES

FIG. 1 is a perspective schematic view of an aircraft cargo compartment showing the equipment typical of that utilized for airdropping cargo;

FIG. 2 is an enlarged fragmentary cross sectional view taken along line 2—2 of FIG. 1;

FIG. 3 is a top plan view of the cutting head constructed in accordance with this invention with the top wall removed for clarity;

FIG. 4 is a longitudinal sectional view taken along the line 4—4 of FIG. 3;

FIG. 7 is a side elevational view of the power cord take-up head constructed in accordance with this invention, showing the side wall removed for clarity;

FIGS. 8-10 are schematic front elevational views of the power cord take-up head, showing various stages of the torsion spring housed therein and with the front wall removed for clarity; and FIGS. 11a-11d are schematic cross sectional views of an aircraft cargo compartment illustrating the operation of the cable severing apparatus of this invention.

DETAILED DESCRIPTION OF AN ILLUSTRATIVE EMBODIMENT

Figure 6:
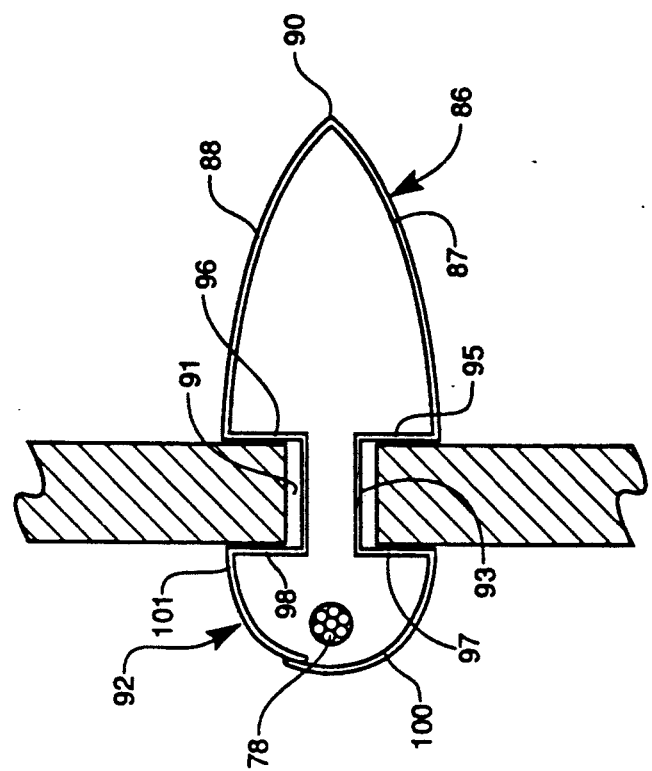
FIG. 6 is a side elevational view of the retaining clip of FIG. 5, showing the clip inserted in a wall structure.

Referring now in detail to the illustrative embodiment depicted in the accompanying drawings, there is shown in FIG. 1 an exemplary aircraft cargo compartment, comprehensively designated 10, containing a load 11 for subsequent air drop delivery and a load extraction system, generally designated 12. The load 11 is rigidly secured to a platform 13 by any suitable means (not shown) and is adapted to move longitudinally therewith along a conveyor 15 comprised of at least two laterally spaced rows of rollers 16 freely rotatably mounted along the floor of the cargo compartment 10. Platform 13 is provided with lateral extensions 17 projecting outwardly from opposite sides of platform 13 beneath the overlying and inwardly extending lips 18 (FIG. 2) forming a part of laterally spaced guide rails 20 extending lengthwise of the cargo compartment 10. The spaces formed between extensions 17 define openings 21 for receiving latches or detents 22 (only one of which is shown in FIG. 1) forming a part of laterally spaced locking mechanisms provided along the sides, respectively, of conveyor 15. These locking mechanisms (not shown) secure the load-laden platform 13 in place along the conveyor 15 and, for purposes of this description, will be designated left-hand locks and right-hand locks when viewed in a direction toward the cockpit or forward end of the aircraft. Since the platform locking arrangement is well known and forms no part of this invention, a further detailed description thereof is not believed necessary. A few minutes prior to reaching the cargo airdrop point, a suitable control means (not shown) is activated by the loadmaster for activating the left-hand locks to displace detents 22 from their respective openings along the left side of the conveyor 15. However, the right-hand locks remain engaged until automatically released by a predetermined force such as that generated by the deployment of the extraction parachute as will hereinafter be described in detail.

The load extraction system 12 includes an extraction parachute 23 detachably secured to a release unit 25 affixed to the ceiling of the cargo compartment near the aft exit door (not shown). Suitable control means are provided for actuating the release unit 25 to free extraction parachute 23 for swinging movement outwardly through the open aft exit door. The extraction parachute 23 is provided with a cover 26 tethered at one end thereof by line 27 to an extension arm 28 of unit 25 for separating the cover 26 from extraction parachute 23 as it exits the aircraft.

The other end of extraction parachute 23 is connected by an elongated extraction line 30 to a force transfer coupling 31, in turn connected by lines 32 and 33 to dual recovery parachutes 35 and platform 13, respectively. The load 11 is suitably connected to recovery parachutes 35 by numerous support straps (not shown) disposed and folded beneath the recovery parachutes 35 between the latter and load 11. The recovery parachutes 35 in their packed forms are initially secured to the load 11 by a releasable restraint strap 36 which overlies the parachutes 35 and is secured at its opposite ends to the platform 13. Line 32 is connected as by ring 37 to a series of lines 38 connected to the bags or covers 40 of parachutes 35 and a line 41 having a clasp 42 looped about the restraint strap 36.

In operation, as the aircraft approaches the cargo drop point, the left-hand locks are disengaged and the rear door of the aircraft is opened. The pilot or loadmaster then actuates the control means for releasing the extraction parachute 23 from release unit 25. The extraction parachute 23 swings downwardly through an arcuate path (toward the left as seen in FIG. 1) and exits the aircraft causing the cover 26 thereof to be removed by means of the static line 27 to initiate deployment of the extraction parachute 23.

As the extraction line 30 unravels and becomes taut upon full inflation of extraction parachute 23, the drag force exerted thereby overcomes the resistance of the right-hand locks, disengages them, and withdraws, via extraction line 30, link 31, and line 33, the cargo laden platform 13 along rollers 16 rearwardly through the cargo compartment and out of the aft exit door. As the load 11 exits the aircraft and free falls by gravity, the force transfer coupling 31 transfers the extraction force from the cargo-laden platform to the bags 40 holding the recovery parachutes 35. Line 32 now becomes taut and is effective to pull clasp 42 severing restraint strap 36 and freeing the recovery parachutes 35 as well as remove the parachute covers 40 via the several lines 38. This initiates deployment and inflation of the recovery parachutes 35 in a manner well known in the art for smoothly lowering the load 11 onto the surface drop point area. The apparatus and procedure described above is well known and is intended only to illustrate an exemplary or typical mode of airdropping a load or cargo from an aircraft and, per se, forms no part of this invention.

In accordance with this invention, an extraction line cutting apparatus, comprehensively designated 43, suitably attached as by bolts 45 to the cargo compartment structure, is provided for severing the extraction line 30 in the event of an airdrop malfunction wherein the load laden platform 13 fails to move rearwardly or otherwise be extracted as might occur on failure of the extraction parachute to deploy or the rail locking system to release. The cutting apparatus 43 comprises a displaceable cutting head assembly, generally designated 46, and a power cord take-up assembly, generally designated 47.

Figure 5:
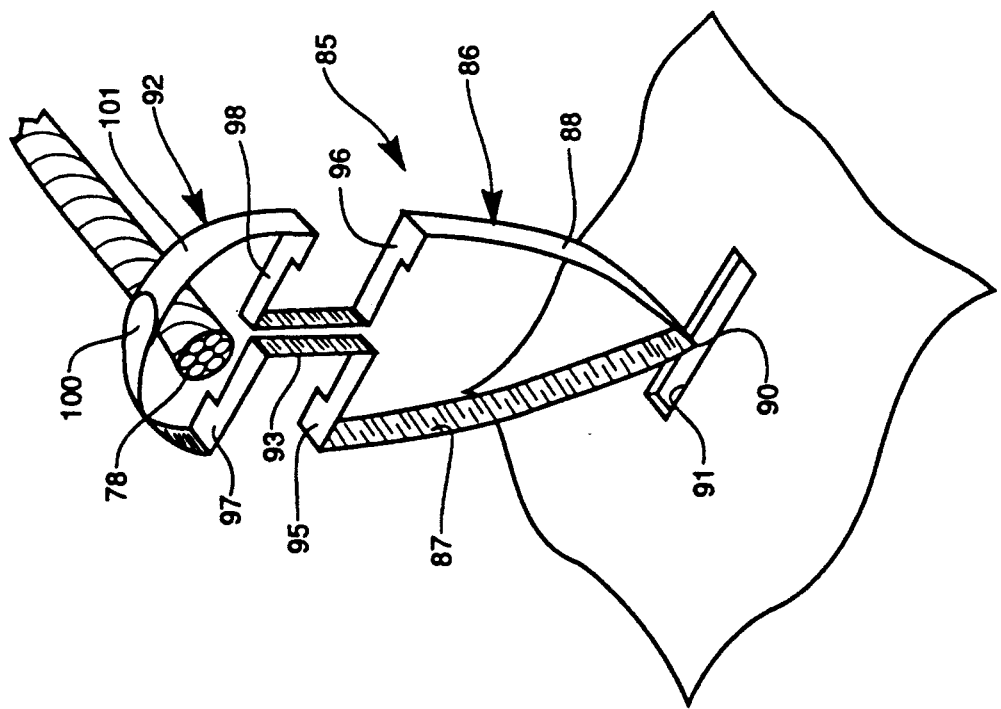
FIG. 5 is a perspective view of a retaining clip used in conjunction with this invention.

As best shown in FIGS. 3-5, the cutting head assembly 46 includes a housing 48 formed of a top wall 50, a bottom wall 51, a pair of opposite side walls 52 and 53, and a rear wall 55. The forward end of housing 48 is open with generally V-shaped recesses 56 formed in side walls 52 and 53 to provide an inlet for receiving the extraction line 30 as will hereinafter become apparent. The terms upper, lower, forward, rear and the like are used herein only for convenience of description with reference to FIGS. 3 and 4 and are not intended to limit the scope of this invention.

The housing 48 contains a pair of opposed circular cutting blades 60 and 61 mounted on spindles 62 and 63, each suitably journalled for rotation in axially spaced bearings 65 and 66 rigidly secured to the opposite side walls 52 and 53 of housing 48. A pair of electric motors 67 (only one shown in FIG. 3) mounted within the housing 48 are connected via conductor 68 to a power cord 69 extending from the housing 48 to the power cord take-up assembly 47. These motors 67 are provided with drive shafts 70 and 71 having gears 72 and 73 rigidly mounted thereon which mesh with gears 74 and 75 affixed to spindles 62 and 63 to effect rotation of the blades 60 and 61 in opposite directions. While a pair of opposed cutting blades 60 and 61 are employed in the preferred embodiment, it should be appreciated that any number of blades or severing devices, including pyrotechnic driven cutters, could be used in lieu thereof within the purview of this invention.

The cutting head assembly 46 also includes a take-up reel 76 comprised of side-by-side or adjacent spools 77 about which the opposite ends of a wire or cable 78, hereinafter referred to as a "viper line", is attached and wound. The reel 76 is mounted on a rotatable spindle 80 journalled for rotation in suitable bearings 81 (only one of which is shown in FIG. 3) and driven by an electric motor 82 connected by the conductor 68 to power cord 69.

The viper line 78 is guided about a plurality of guide rolls 83 mounted on the top and bottom walls 50 and 51 of the housing 48 and extends outwardly therefrom in a divergent path. The viper line 78 extends beneath the extraction line 30 and about the entire inner periphery of the cargo compartment 10 in a closed loop to circumscribe the extraction line 30 yet be normally disposed in an out-of-the way position along the compartment cargo walls so as not to interfere with the apparatus and procedure of a normal cargo drop. The viper line 78 is releasably secured along the compartment cargo walls by a series of retainer clips 85 mounted therealong.

As best shown in FIGS. 5 and 6, each retainer clip 85 is comprised of a plastic or other suitable material fabrication of unitary, one-piece construction formed to provide a generally V-shaped body portion 86 of opposed legs 87 and 88 converging at an apex 90. The legs 87 and 88 are adapted to be compressed toward each other for insertion in a slot 91 formed in the inner walls of cargo compartment 10. The clip 85 is formed with a cable retaining head 92 joined to body portion 86 by a restricted or reduced width neck portion 93. The transition between body portion 86 and neck portion 93 defines a pair of shoulders 95 and 96 adapted for snap-fitted engagement behind the outer surface of the compartment cargo walls as shown in FIGS. 5 and 6. The retaining head 92 is formed with laterally extending portions 97 and 98 connected to a pair of arcuately curved portions 100 and 101 adapted to overlap at their respective ends.

A series of such clips 85 are secured about the inner walls of the cargo compartment 10 for releasably securing the viper line 78 therealong. A radial outward pulling force exerted on the viper line 78 as will hereinafter become apparent bears against the curved portions 100 and 101 to spread them apart for releasing the viper line 78 from within the several retaining heads 92 for a purpose that will presently be described. If desired, velcro strips could be employed in place of the clips 85 within the scope of this invention.

Referring now to FIGS. 7-10, the take-up assembly 47 includes a housing 102 of generally circular configuration having a partition 103 separating the interior of the housing into two compartments 105 and 106. A central spindle 107 extends axially through the housing 102 and is freely rotatable within suitable bearings 108 and 110. The power cord 69 is wound about spindle 107 in compartment 105 with its one end secured within the interior of spindle 107. The power cord 69 projects through a slot 111 formed in the housing 102 and is connected at its other end to the cutting head assembly 46 as earlier mentioned. The end of the power cord 69 within spindle 107 is connected via a slip ring 112 to a conductor 113 in turn connected to a suitable source of electric power.

A torsion spring 115 is mounted within compartment 106 and is secured at one end to spindle 107 as at 116 and at the other end thereof as by fastener 117 to the circular peripheral wall of housing 102. In the inoperative position of apparatus 43 with the cutting head 46 retracted, the spring 115 is relaxed as shown in FIG. 8. Extension of the cutting head 46 as will hereinafter be described draws the power cord 69 therewith out of the compartment 105 through slot 111. This effects rotation of the spindle 107 in a counterclockwise direction as viewed in FIGS. 8-10 to increasingly compress spring 115 as the power cord 69 is played out. The compressed torsion spring 115 becomes effective to subsequently retract the power cord 69 along with the cutting head 46 as will presently be described.

The normal operation of the cargo/load extraction system 12 has been described above. In the event of a malfunction, such as could occur if the extraction parachute doesn't fully deploy or the load/platform package, although released, fails to budge and slide rearwardly toward the exit open end of the aircraft, operation of the extraction line cutting apparatus 43 is initiated by the pilot or loadmaster.

FIG 11a depicts apparatus 43 in its normal inoperative position with the viper line 78 disposed along the peripheral walls of the cargo compartment 10 and held in place by retainer clips 85. Upon actuation of apparatus 43, the motor 82 is energized to rotate the take-up reel 76 of cutting head 46 to initiate gathering of the viper line 78. As shown in FIG. 11b, the force generated by winding the viper line 78 about the reel 76 overcomes the minimal restraining force of retainer clips 85 to progressively pull the line 78 therefrom. As the viper line 78 collects about and embraces the extraction line 30 (FIG. 11c), the reactive force generated thereby overcomes the relaxed tension of torsion spring 115 in take-up assembly 47 to initiate extension of the cutting head 46 which pulls the power cord 69 therewith as it unwinds from freely rotatable spindle 107. Simultaneously, the torsion spring 115 is progressively compressed (FIGS. 9 and 10) as it coils about the rotating spindle 107. The approaching cutting head 46 brings the rotating cutting blades 60, 61 thereof into engagement with the extraction line 30 (FIG. 11d) to sever the same. Upon the severance of extraction line 30 with consequent removal of the reactive force, the wound and loaded torsion spring 115 begins to relax and uncoil in a clockwise direction for withdrawing the power cord 69 along with cutting head 46. The power cord 69 is wound about spindle 107 as it is withdrawn and retracts the cutting head 46 to its home position.

From the foregoing, it is apparent that the objects of this invention have been fully accomplished. As a result of the present invention, a new and improved apparatus is provided for safely severing a parachute extraction line to release the extraction parachute from the load in the event of a cargo airdrop malfunction. Providing the severing apparatus with an extensible cutting head having a viper line adapted to embrace and coact with the extraction line generates a reactive force capable of drawing the cutting head into engagement with the extraction line for severing the same thereby avoiding manual severing of the extraction line behind the load which could cause injury to or otherwise jeopardize the life of an aircraft crewman.

It is to be understood that the form of the invention herein shown and described is to be taken as an illustrative embodiment only and that modifications thereof can be made without departing from the broad spirit and scope of this invention as defined in the appended claims.

I claim:

1. An apparatus for severing an extraction line connected at the opposite ends thereof to an extraction parachute and a cargo load located in an aircraft comprising: a viper line looped about said extraction line and releasably secured along the interior walls of said aircraft, an extensible cutting head having cutting means mounted therein, said cutting head including a take-up reel for coiling said viper line thereabout, means for rotating said reel to wind said viper line about said reel and draw said viper line into engagement with said extraction line to generate a reactive force for extending said cutting head and cutting means into engagement with said extraction line for severing said extraction line.

2. A severing apparatus according to claim 1 wherein said cutting means includes a pair of opposed rotary cutting blades, and means for rotating said cutting blades.

3. A severing apparatus according to claim 2 wherein said blade rotating means and said reel rotating means comprise electric motors, respectively, and means connecting said motors to an electrical power source.

4. A severing apparatus according to claim 1 wherein said take-up reel comprises adjacent spools about which the opposite ends of said viper line are attached and wound.

5. A severing apparatus according to claim 1 including a plurality of retainer clips mounted along said aircraft interior walls for normally retaining said viper line in place.

6. A severing apparatus according to claim 1 including a housing secured to an interior wall and having a spring loaded spindle, a power cord connected at one end thereof to said spindle for electrical connection to a power source and the other end thereof connected to said cutting head, said power cord wrapped about said spindle and adapted to be uncoiled upon extension of said power cord.

7. A severing apparatus according to claim 6 including a partition in said housing defining two compartments therein, said power cord contained in one of said compartments.

8. A severing apparatus according to claim 7 including a torsion spring mounted in the other of said compartments and connected to said spindle for compression upon rotation of said spindle in a direction playing out said power cord, said spring becoming relaxed upon removal of said reactive force to rotate said spindle in an opposite direction to retract said power cord and said cutting head therewith.

* * * * *